(12) United States Patent
Domergue

(10) Patent No.: US 9,139,288 B2
(45) Date of Patent: Sep. 22, 2015

(54) METHOD OF COMMUNICATION ON AN AIRCRAFT OR A SPACECRAFT, VIA THE OUTSIDE ENVIRONMENT

(75) Inventor: Jean-Paul Domergue, Toulouse (FR)

(73) Assignee: AIRBUS SAS, Blagnac (FR)

( * ) Notice: Subject to any disclaimer, the term of this patent is extended or adjusted under 35 U.S.C. 154(b) by 352 days.

(21) Appl. No.: 13/427,399

(22) Filed: Mar. 22, 2012

(65) Prior Publication Data

US 2012/0248254 A1 Oct. 4, 2012

(30) Foreign Application Priority Data

Mar. 29, 2011 (FR) ...................... 11 52563

(51) Int. Cl.
*B64C 13/50* (2006.01)
*B64D 47/00* (2006.01)
*G08C 17/02* (2006.01)

(52) U.S. Cl.
CPC ................ *B64C 13/50* (2013.01); *B64D 47/00* (2013.01); *G08C 17/02* (2013.01); *Y02T 50/44* (2013.01)

(58) Field of Classification Search
CPC ............ H04B 7/14; H04B 7/145; H04B 7/15; B64C 13/50; B64D 47/00; G08C 17/02; Y02T 50/44
USPC ............. 455/7, 11.1, 41.2; 340/945, 971, 973
See application file for complete search history.

(56) References Cited

U.S. PATENT DOCUMENTS

| | | | |
|---|---|---|---|
| 4,887,779 A * | 12/1989 | Large | 244/1 R |
| 5,531,402 A | 7/1996 | Dahl | |
| 6,317,452 B1 * | 11/2001 | Durrant et al. | 375/130 |
| 7,231,180 B2 * | 6/2007 | Benson et al. | 455/41.2 |
| 7,773,564 B2 * | 8/2010 | Heath et al. | 370/334 |
| 8,022,843 B2 * | 9/2011 | Mitchell et al. | 340/973 |

FOREIGN PATENT DOCUMENTS

EP 2 048 637 A2 4/2009

OTHER PUBLICATIONS

Jan. 9, 2012 French Preliminary Search Report issued in French Patent Application No. 1152563 (with translation).

* cited by examiner

*Primary Examiner* — Raymond Dean
(74) *Attorney, Agent, or Firm* — Dickinson Wright PLLC

(57) ABSTRACT

In the method of communication on a vehicle including an aircraft or a spacecraft, the vehicle transmits an electromagnetic signal from at least one transmitter on-board the vehicle directly to at least one receiver on-board the vehicle and with transmission taking place solely through an environment outside the vehicle. Transmission takes place several times over, and during transmission at least one member from the group including the transmitter and the receiver is set into movement relative to a support in direct contact with the member and with a portion of the vehicle carrying the member.

15 Claims, 5 Drawing Sheets

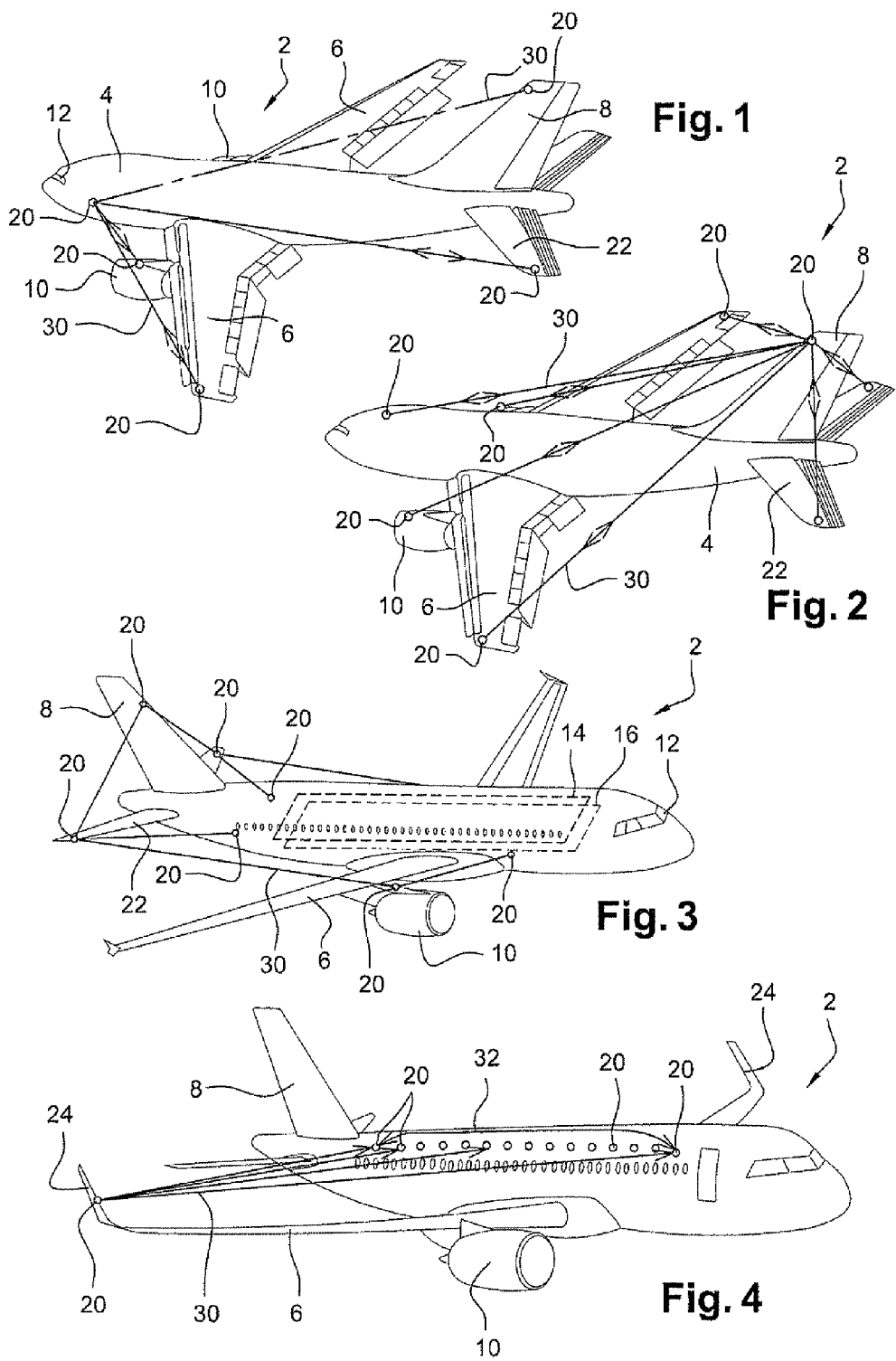

METHOD OF COMMUNICATION ON AN AIRCRAFT OR A SPACECRAFT, VIA THE OUTSIDE ENVIRONMENT

FIELD OF THE INVENTION

The invention relates to vehicles constituting aircraft or spacecraft, and it relates in particular to communication on board such vehicles.

BACKGROUND OF THE INVENTION

Within an airplane, numerous on-board members exchange data signals over one or more wired on-board communications networks. By way of example, these members are computers, sensors, or indeed power members. These exchanges of signals enable the on-board computers and the pilot to have up-to-date data instantaneously for optimizing the control and the operation of the airplane. They also enable controlled members to be controlled without delay via means that are not mechanical.

OBJECT AND SUMMARY OF THE INVENTION

An object of the invention is to improve communication on board vehicles constituting aircraft and spacecraft.

To this end, the invention provides a method of communication on a vehicle constituting an aircraft or a spacecraft, wherein the vehicle transmits an electromagnetic signal from at least one transmitter on-board the vehicle directly to at least one receiver on-board the vehicle and solely through an environment outside the vehicle, and wherein transmission takes place several times over, and during transmission at least one member from the group comprising the transmitter and the receiver is set into movement relative to a support in direct contact with the member and with a portion of the vehicle carrying it.

Thus, transmission takes place without a physical medium extending from the transmitter to the receiver, and it takes place outside the inside volume of the vehicle. The communication may be bi-directional and may involve multiple transmitters and/or receivers. This presents numerous advantages. At least some of the internal cabling of the airplane can be omitted, thereby saving weight and reducing the associated installation and maintenance costs. Safety is increased since the wireless communications network as constituted in this way is much less exposed to structural failures of the vehicle than is a wired network. Safety is also improved by avoiding the constraints that are usually associated with electrical cabling, such as numerous connectors, the risk of electrical arcs appearing, the risk of interference within a given bundle of electric cables, the necessity of segregating routes, or indeed the effects of maintenance actions. Communications may also benefit from better electromagnetic protection from high frequency interference and from radars, and indeed from lightning. The method enables the communications network to be set up with a mesh configuration that is tolerant against numerous types of communications breakdown. Signal power may easily be made compatible with safety for the crew on-board, for personnel on the ground, and for the passengers of the vehicle, if any.

Furthermore, a single transmitter may co-operate with a plurality of receivers lying within the field scanned by the transmitter. Conversely, several transmitters may lie within the field scanned by a single receiver, the receiver receiving the signal(s) coming from one of them or from each of them.

The method of the invention may be implemented in various modes, some of which are mutually compatible:
 there is only one transmitter and there are at least two receivers;
 there are at least two transmitters and only one receiver;
 there are the same number of transmitters and receivers, said number being at least two, transmission taking place simultaneously from a first of the transmitters exclusively to a first of the receivers and from a second of the transmitters exclusively to a second of the receivers; and
 the or each receiver is a first transmission receiver and forms a relay, with the vehicle subsequently transmitting the signal from the or each relay directly to at least one second transmission receiver, transmission taking place solely through the outside environment.

In one implementation, there is only one transmitter, there being at least two relays, and only one second transmission receiver.

This implementation thus provides redundancy of transmission from the initial transmitter to the final receiver so as to be more certain of guaranteeing that the communication gets through.

The method may easily be implemented using wavelengths that are compatible with use in the atmosphere, and in particular in the presence of moisture, ice, etc.

Transmission may in particular be optical, i.e. in the light spectrum that is visible to the human eye, i.e. with a wavelength lying in the range 380 nanometers (nm) to 780 nm.

Provision may be made for transmission to take place by laser. The laser may operate in the visible spectrum or in the infrared, the ultraviolet, or the X-ray range.

Provision may also be made for transmission to take via radiowaves, at a frequency of less than 3000 gigahertz (GHz), and a wavelength longer than 0.1 millimeters (mm). The frequency may even be less than 3 GHz.

Advantageously, transmission takes place simultaneously on at least two different wavelengths.

The resulting redundancy also improves the reliability of communication.

Provision may be made for the vehicle to forward the signal to an internal on-board communications network of the vehicle.

The invention also provides a communications method on a vehicle forming an aircraft or a spacecraft, wherein at least one member on board the vehicle transmits an electromagnetic signal in an environment outside the vehicle directly to at least one other member on board the vehicle, and wherein transmission takes place several times over and during transmission the transmitter is set into movement relative to a support in direct contact with the transmitter and with a portion of the vehicle carrying it.

The invention also provides a communications method on a vehicle forming an aircraft or a spacecraft, wherein at least one member on board the vehicle receives an electromagnetic signal in an environment outside the vehicle directly from at least one other member on board the vehicle, and wherein reception takes place several times over and during reception the receiver is set into movement relative to a support in direct contact with the receiver and with a portion of the vehicle carrying it.

Finally, the invention also provides a vehicle constituting an aircraft or a spacecraft, the vehicle including at least one on-board transmitter and at least one on-board receiver arranged in such a manner that the vehicle transmits, several times over, an electromagnetic signal from the transmitter directly to the receiver and solely through an environment outside the vehicle, and during transmission at least one member from the group comprising the transmitter and the receiver is set into movement relative to a support in direct contact with the member and with a portion of the vehicle carrying the member.

Preferably, the or one of the transmitters or receivers is carried directly by one of the following elements of the vehicle: a fuselage, a tail, a wing, an engine, and a mast.

BRIEF DESCRIPTION OF THE DRAWINGS

Other characteristics and advantages of the invention appear further from the following description of several embodiments given as non-limiting examples and with reference to the accompanying drawings, in which:

FIGS. 1 & 2, 3, 4 & 5, and 6 & 7 are respective perspective views of airplanes in five embodiments of the invention;

MORE DETAILED DESCRIPTION

Figure 5:
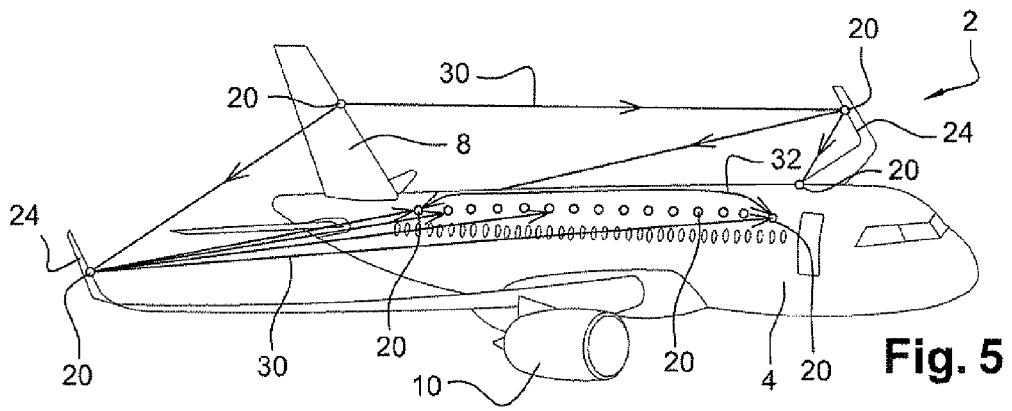

FIGS. 1 and 2 show an aircraft of the invention. In the present embodiments it is a fixed wing aerodyne constituting an airplane 2.

Nevertheless, the invention is also applicable to rotary wing aircraft such as helicopters, or even to aerostats. The invention applies not only to vehicles suitable for moving in the atmosphere, but also to vehicles suitable for moving in space outside the atmosphere, e.g. satellites or launchers.

The aircraft comprises a fuselage 4, two wings 6, a tail fin 8, a tail plane 22, and jets 10 fastened to respective ones of the wings. At the front of the fuselage 4 it has a cockpit 12.

The airplane 2 is fitted with one or more internal on-board communications networks such as the networks 14 and 16 shown on the airplane in the embodiment of FIG. 3. These are cabled or wired networks providing signal transmission between members of the airplane, in the environment inside the airplane, in the form of an electric current or a light beam if using an optical fiber network. The network may also be a wireless transmission network.

The airplane 2 has various on-board members and devices (not shown) that need to communicate with one another using the method of the invention. These members comprise in particular on-board calculation units constituting computers, sensors suitable for measuring this or that magnitude or this or that parameter relating to the environment of the airplane or to its operation (thermometer, Pitot tube, a member monitoring a parameter relating to the operation of one of the engines, a member detecting the filling level of a fluid tank, etc. . . . ), or indeed electrical or electronic members, in particular power members such as one or more electricity generators, one or more electricity transformers, or another actuator, etc.

The airplane 2 also has members 20 forming an on-board communications network situated outside the airplane.

In the airplane of FIGS. 1 and 2, certain members 20 are thus fastened to the top end of the tail fin 8, to the free ends of the wings 6, to the top of each engine 10, and to the fuselage, at the front end on its left-hand face and also on its top face.

In the airplane of FIG. 3, certain members 20 are fastened to the mast connecting an engine 10 to the corresponding wing, and others are fastened to the tail plane 22.

In the airplane of FIGS. 4 and 5, several members 20 extend along the fuselage on one side thereof, forming a horizontal row going from the cockpit to the tail. A member 20 is also fastened to the end marginal vertical winglet 24 situated at the end of each wing.

Figure 6:
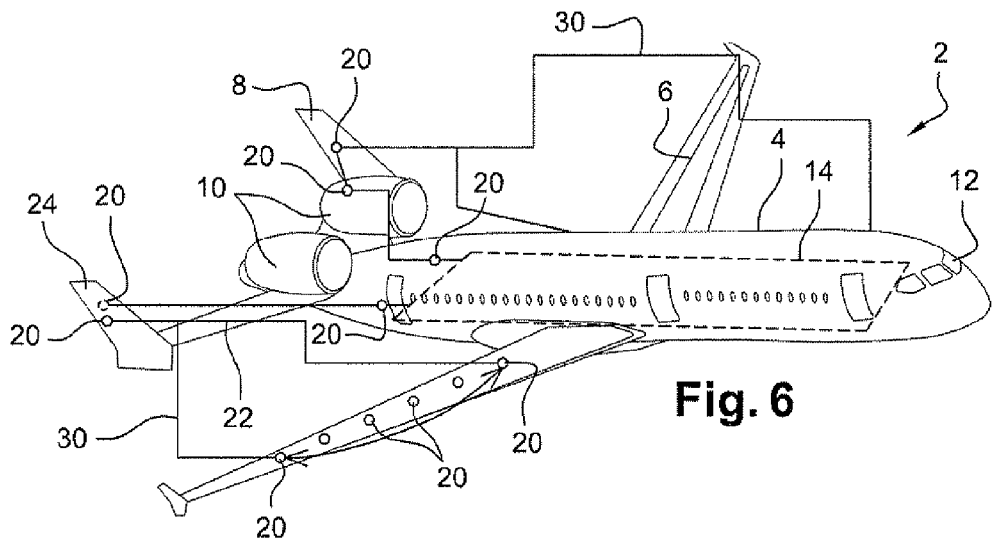

The airplane of FIG. 6 does not have any thrusters fastened to the wings, unlike the airplanes of FIGS. 1 to 5 and 7. The two thrusters of the airplane are fastened to the rear portion of the fuselage, on the top thereof. The tail is reduced to a horizontal tail plane. The ends of the two portions of the horizontal tail plane carry winglets. The airplane has members 20 fastened to its respective engines 10. The horizontal tail plane 22 presents marginal vertical winglets 24 at its ends, which winglets also have members 20 fastened thereto.

Figure 7:
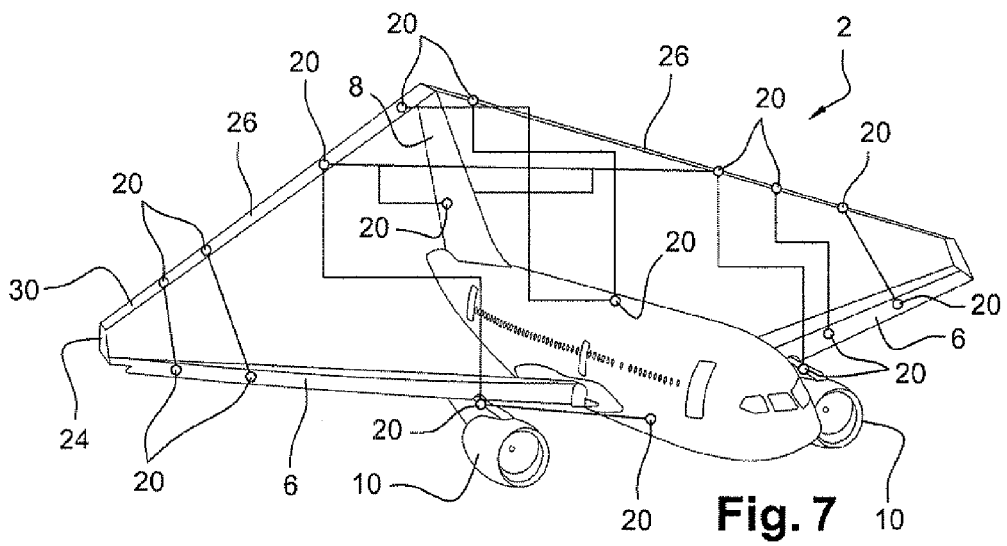

Finally, in the embodiment of FIG. 7, the ends of the wings 6 also carry marginal vertical winglets that are in turn connected directly to the top end of the vertical tail fin 8 by means of respective wings 26, which wings are plane, rectilinear, and inclined relative to the longitudinal and vertical directions of the airplane. The wings of the airplane thus comprise not only its wings 6, but also its wings 26. Several members 20 are fastened to each of the wings 26, along their length.

Some of the above-mentioned members 20 are signal transmitters and are suitable only for transmitting a signal. Others are receivers and are suitable only for receiving a signal. Yet others are relays and suitable for receiving a signal and for transmitting it to another receiver. Below, and unless specified to the contrary, the term "transmitter" is used to designate any member that is suitable for transmitting a signal, regardless of whether or not that member is also suitable for receiving a signal. Similarly, the term "receiver" is used to designate any member suitable for receiving a signal, regardless of whether that member is also suitable for transmitting a signal. Thus, in particular, the relays may be referred to as transmitters and/or as receivers.

In all of the embodiments of the figures, the members 20 communicate directly with one another by means of electromagnetic signals passing solely through an environment outside the airplane, i.e. the atmosphere, from one of the members to another.

FIGS. 8 to 13 show various communications configurations used for transmitting signals between the members 20 and constituting a corresponding number of implementations of the method of the invention.

Figure 8:
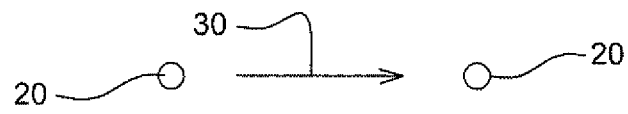
FIGS. 8 to 13 are respectively six individual diagrams of signal transmission on the airplanes of FIGS. 1 to 7.

In FIG. 8, an on-board transmitter 20 of the airplane transmits the electromagnetic signal 30 directly to an on-board receiver 20 of the airplane.

Figure 9:
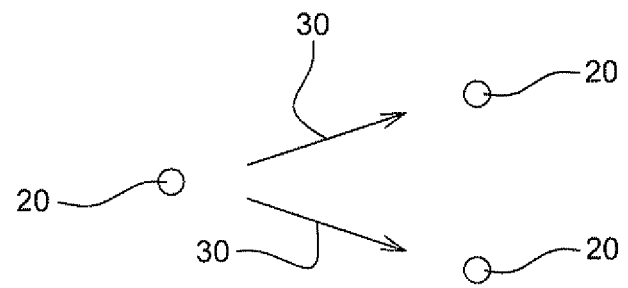

In FIG. 9, the same transmission takes place from a single transmitter 20, but there are two receivers 20. The transmitter thus transmits the signal both to the first receiver and to the second receiver, with the transmission from the transmitter to each of the receivers taking place directly without passing via any other member.

Figure 10:
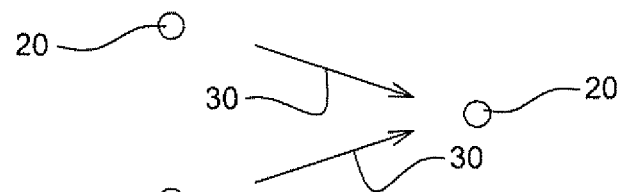

FIG. 10 shows the inverse configuration: there are two transmitters 20 but only a single receiver 20. Each of the transmitters thus transmits the electromagnetic signal directly to the receiver.

Figure 11:
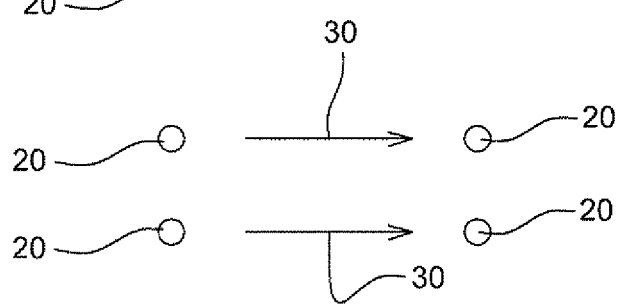

In FIG. 11, there are the same number of transmitters 20 and of receivers 20, specifically there are two of each, and they are associated in pairs with one-to-one correspondence. Transmission takes place from the first transmitter exclusively and directly to the first receiver, and from the second transmitter exclusively and directly to the second receiver. Each of the transmitters thus transmits a single signal and each of the receivers receives a single signal. This is a mode in which the signal is transmitted in parallel in order to provide communications redundancy.

In each of these three configurations with two transmissions, the transmissions may take place simultaneously or successively in time.

Figure 12:
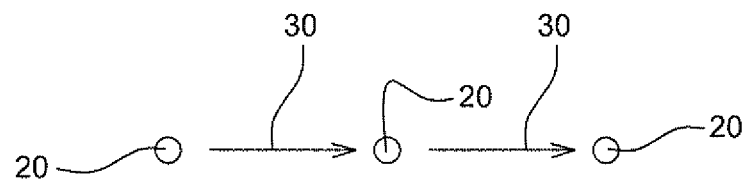

In FIG. 12, there is the same basic scheme as in FIG. 8 with the transmitter 20 transmitting the signal 30 to the receiver 20. This receiver, referred to herein as the "first transmission receiver" forms a relay. In turn, it transmits the signal to a second receiver 20 referred to as the "second transmission receiver". The signal is thus transmitted directly from the transmitter to the relay and then directly from the relay to the second receiver.

Figure 13:
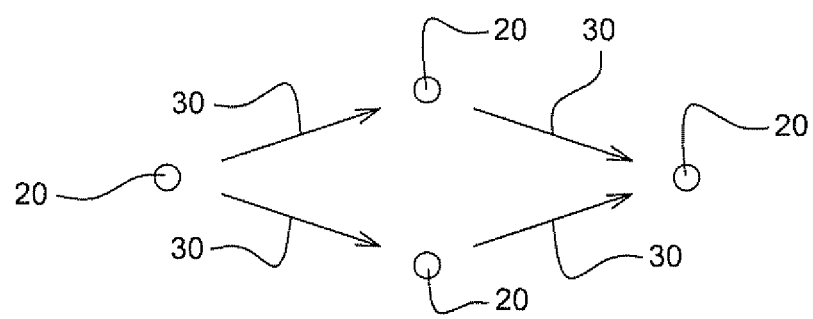

FIG. 13 shows a combination of the schemes of FIGS. 8 and 10. The initial transmitter 20 sends a signal 30 directly to two first transmission receivers 20, both forming relays. These relays transmit the signal as received in this way to a single second transmission receiver 20. Transmission between the single initial transmitter and the single final receiver thus takes place via a plurality of relays and follows different channels. This likewise constitutes communication with redundancy. Communication over the respective channels may take place simultaneously or successively in time.

These basic configurations may be combined with one another as explained in the examples below. In particular, when transmissions follow one another in series as shown in FIGS. 12 and 13, provision may be made for the number of relays to be equal to two or three or more. Similarly, when transmissions take place in parallel, thereby providing redundancy as shown in FIGS. 9, 10, 11, and 13, the number of channels providing parallel transmission for the communication may be equal to three or more. Provision may also be made for communications to take place in parallel over a plurality of channels over a portion of the paths, and over a single channel beforehand or afterwards.

There follows a description of various examples of communications configurations using the method of the invention on the airplanes of FIGS. 1 to 7. It should be understood that provision may be made for an airplane to be suitable for implementing several of the configurations, or indeed all of them.

On the airplane of FIG. 1, the member 20 situated at the front of the fuselage communicates directly with each of the members situated respectively on the engine 10, at the end of the wing 6, on the tail fin 8, and on the tail plane 22. Each of these communications is bi-directional, the member 20 on the fuselage being suitable for receiving signals directly from each of said members and for transmitting signals directly to them. The member 20 is also connected to the internal on-board network 14, 16 of the airplane by means that are not shown. It is thus suitable for communicating with one or more on-board computers. In FIG. 2, the member 20 situated on the tail fin 8 is also connected directly to the internal communications network of the airplane. This member is suitable for being in direct bi-directional communication with each of the members 20 situated respectively at the front end of the fuselage, on the top portion thereof, on the engines 10, at the ends of the wings, and at the ends of the tail plane. All of the communications shown in FIGS. 1 and 2 are simple point-to-point links.

Such a link is also provided on the airplane of FIG. 3 in which the transmitter 20 that is situated on the right engine mast sends information by means of a signal to the receiver 20 situated on the right side of the fuselage. The receiver member is coupled directly to the on-board networks 14 and 16, thereby enabling the signal to be forwarded to destination on-board members.

In a variant or in order to provide redundancy, provision may be made for the member 20 on the mast to transmit the signal to the relay 20 situated on the right tail plane and for the relay 20 to forward the signal to the receiver likewise fastened to the right side of the fuselage, but located close to the tail of the airplane. At this receiver, the signal is once more transferred to the on-board network 14, 16.

Provision may be made for these two communications from the mast to take place simultaneously in redundant manner. Provision may also be made for the signal received by the right portion of the tail plane also to be forwarded therefrom to the relay 20 situated on the tail fin from which it is once again transmitted to a relay situated on the left portion of the tail plane and to one or more members 20 situated on the left side of the fuselage for forwarding to the on-board networks 14 and 16. The relay situated on the tail fin thus enables signals to transit from one side of the airplane to the other through the atmosphere. This provides transmission redundancy insofar as the signals following different routes do not make use of the same components.

Figure 15:
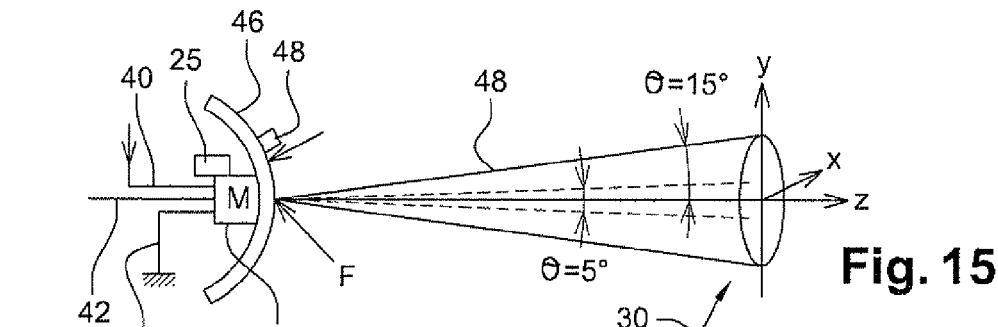
FIGS. 15 to 19 show five embodiments of transmitters and receivers mounted on such airplanes for implementing the method of the invention.

As on the airplane of FIGS. 4 and 5 and more generally in all embodiments of the present application, provision is made for one of the members or an element of said member to be mounted to be movable relative to a support 25 as shown in FIG. 15, which support is in direct contact firstly with the member and secondly with the remainder of the airplane. This characteristic is compatible with all of the embodiments of members described in the present application. Depending on circumstances, it is thus either the transmitted beam or the receiver optics of a member that is movable. The member may thus scan a certain three-dimensional field in transmission or in reception in order to be capable of co-operating with a plurality of members that are far enough apart from one another to prevent co-operation between said member and the other members if stationary. Thus, in FIG. 4, the member 20 situated on the winglet 24 is a transmitter having a beam that is movable in rotation about a vertical axis so as to cover an angular sector with its apex occupied by the member. This angular sector covers receivers 20, which receivers are fastened to the right-hand side of the fuselage but are situated respectively at the rear and at the front of the airplane. Thus, the member 20 of the winglet transmits the signal several times to the fuselage. The beam is initially pointed towards the member B situated at the front. While the member continues to transmit the signal, the member is set into movement so that the beam scans the above-mentioned angular sector until it reaches the member A situated at the rear. The path of the beam is represented by arrow 32 in FIG. 4. Provision may be made for a plurality of receivers to be fastened between the members A and B, each of which receives the signal while the beam is pointed in its direction. The frequency of the signal and the number of receivers or transmitters are adapted to the type of information conveyed by the signal and as a function of the criticality of the communication (passband, reliability, attenuation, . . . ).

On the airplane of FIG. 5, the member 20 situated on the winglet 24 projecting from the end of the left wing is also movable so as to be capable of transmitting a beam to a plurality of receivers situated on the left side of the fuselage. Specifically, transmission begins at the transmitter 20 situated on the tail fin of the airplane which sends the signal directly to each of the relays 20 situated on the respective winglets 24. Each of them scans the receivers situated facing it on the fuselage so as to transmit the signal thereto. The signal received in this way by the receivers is forwarded in redundant manner to the on-board networks.

Provision may be made for the transmission of the signal by the originating transmitter itself to be performed in redundant manner by using two separate transmitters. For segregation purposes, provision may also be made for the signals coming from the left and right winglets to be received by different ones of the internal networks, or indeed for the corresponding receivers on a given side of the fuselage to be in communication with respective different internal networks.

The method of the invention is compatible with a very wide variety of configurations of spacecraft or aircraft.

On the airplane of FIG. 6, in the mode of communication shown, the on-board network 14 sends a signal containing control information to the two transmitters 20 situated respectively on the fuselage skin on either side of the rear end thereof. Each of these members transmits the signal outside the airplane to the member 20 situated on the inside face of the winglet 24 on the corresponding tail plane portion. The signal is relayed via the winglet to a member 20 situated on its outside face. This member transmits the signal to the wing with a scanning beam as described above in order to transmit the signal to a plurality of receivers 20 extending along the wing. The same transmission takes place in parallel on the other wing from the corresponding tail winglet, for redundancy purposes.

On the airplane of FIG. 7, each of the wings 26 directly carries four members 20, each of the wings 6 directly carries two members, and each mast of an engine 10 carries one member. The tail fin carries a member 20 on each of its side faces. Starting from the end of the right wing 6 furthest from the fuselage, the first member 20 of the wing in the succession is in a direct point-to-point link with the first member 20 of the corresponding wing 26. Likewise, the following member 20 of the wing 6 is in a direct point-to-point link with the following member on the wing 26. The same applies on the other side of the airplane. The member on the mast is in a direct link with the following member of the wing 26, which is also in a direct link firstly with the member on the face of the tail fin that faces the wing 26, and secondly with the corresponding member on the other wing 26. This member is in a direct link with the mast of the other engine. Each of the members 20 of the wing 26 that is closest to the tail fin is in a direct link with the member 20 situated on the top portion of the fuselage. Furthermore, the member 20 on each of the masts communicates directly with the member 20 situated on the facing side of the fuselage.

The mesh of members provided on the outside of the airplane is more or less simple or more or less complex depending on the number of on-board devices that use this communications network and depending on the desired level of reliability. The method of the invention may be implemented using wavelength-division multiplexing and time-division multiplexing.

Figure 14:
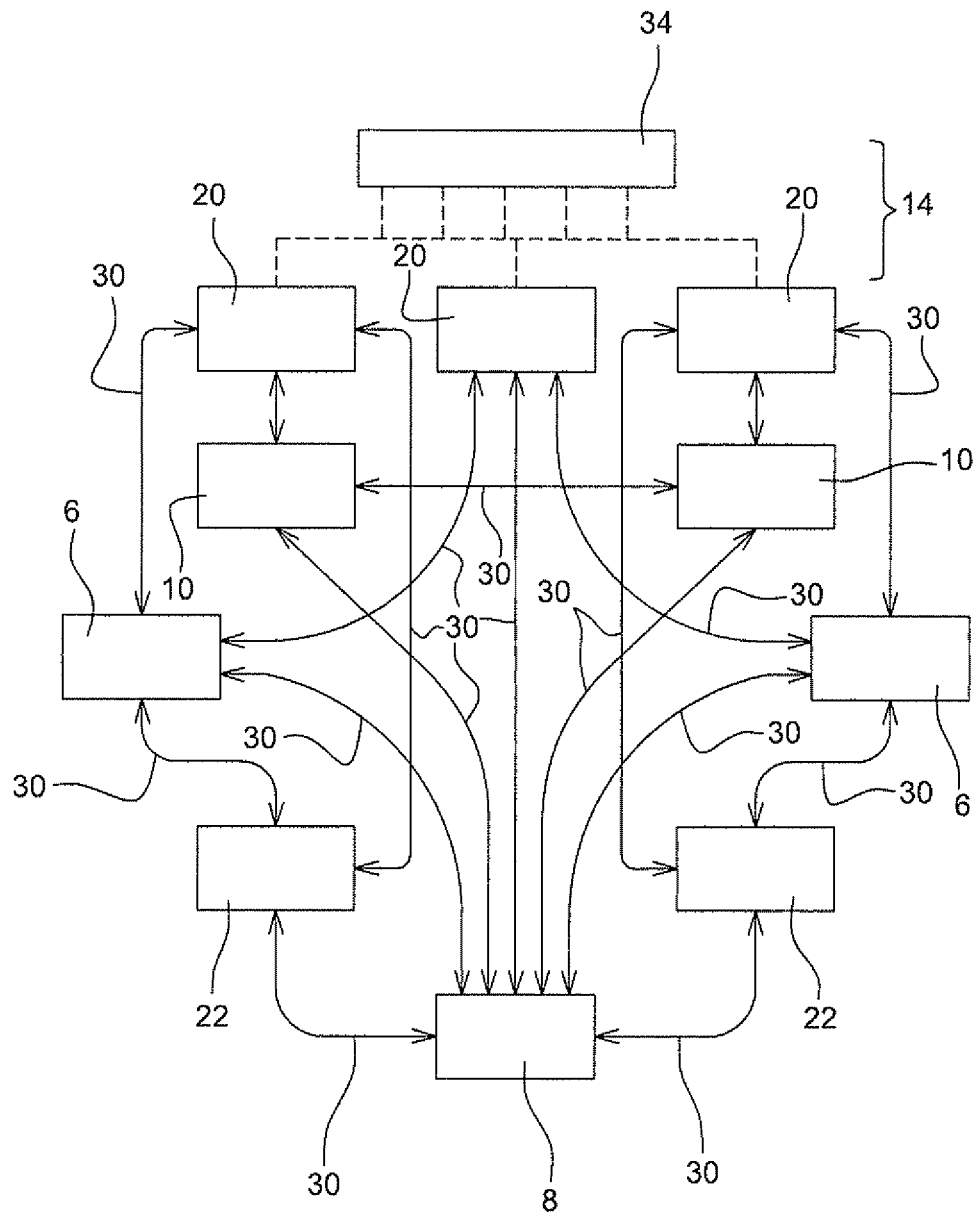
FIG. 14 shows an example of an architecture for a communications network on an airplane of FIGS. 1 to 7.

FIG. 14 shows an example of an organization for the members 20 making up a signal transmission network outside the airplane in the method of the invention. All of the continuous-line arrows in this figure correspond to direct links between the members outside the airplane via radiowaves. The dashed-line links correspond to a wired communications network inside the airplane. The figure shows either the member 20 itself or else the portion of the airplane carrying it. Thus, the equipment bay 34 of the airplane communicates via the network 14 with three members 20 forming transceivers and situated respectively on the left side of the fuselage, in its central portion, and on its right side. The left side member 20 communicates directly with the members of the left wing 6, the left engine 10, and the left tail plane 22. The same applies to the right-hand side of the airplane for the corresponding members. The member of the left engine 10 also communicates directly with the members of the right engine and of the tail fin 8. The member of the left wing 6 also communicates directly with the central member 20 of the fuselage, and with the members of the left tail plane 22 and of the tail fin 8. The same applies for the right wing. Each of the members of the tail plane 22 also communicates directly with the member of the tail fin 8. This member thus communicates directly with the members of the tail plane 22, of the wings 6, of each of the engines 10, and with the central member 20.

Transmission may be configured in a variety of ways between the members. A link may be of the one-to-one type (a point-to-point link), of the p-to-p type (where p is an integer specifying the number of members 20), or indeed a link of the n-to-m type, where n and m are two different integers, each designating a number of members 20. The network formed by the members 20 may have a configuration that is linear, star-shaped, or indeed a mesh. Once the final receiver member has received the signal from the environment outside the airplane, the signal is forwarded to one of the internal on-board networks via one or more internal buses using their own architectures and their own protocols. These may be conventional optical fiber buses or electrical buses. The signal is thus adapted to passing via the member 20 close at the outside wall of the airplane.

Provision may be made for transmission to take place by radiowaves, at one or more wavelengths, e.g. situated around 850 mm or around 1300 mm, or indeed around both wavelengths.

In a variant, transmission may be optical, in this example by laser.

The transmitters comprise light-emitting diodes (LEDs), laser emitters, etc. The receivers may make use of positive intrinsic negative (PIN) diodes or indeed of PIN diodes and field-effect transistors (FETs). The receivers may be made of silicon or of germanium, depending on the wavelengths used.

FIG. 15 shows an embodiment of a transmitter or of the transmitting portion of a relay 20. The member 20 comprises a module M that receives the electrical signal for transmission by means of a cable 40, it is electrically powered by a cable 42, and it is connected to electrical ground by a cable 44. The module M is situated facing a window formed in an outside wall 46 of the airplane, with the transmitted beam 48 passing through the window in order to propagate outside. The module M extends on the inside of this wall. The module M is an electro-optical module having one or more circuits for shaping the signal as an optical signal together with the light emitter and its passive beam-forming system.

Specifically, the shape of the beam is optimized to take account of the fact that the transmitter, regardless of whether or not it is mounted to be movable as described above, may nevertheless be subjected to displacements relative to other portions of the structure of the airplane. Specifically, depending on the deformability of various portions of the airplane, and in particular its wings, it is possible for the members 20 to be displaced by several centimeters, or even several meters relative to one another. For this purpose, it is preferable to have a beam that presents a cross-section that is elliptical in shape in a plane perpendicular to its propagation direction as marked by the axis Z. This shape may be obtained using special optics or in some circumstances directly from the semiconductor laser emitter. The beam thus extends specifically on either side of the axis Z over a total angular sector of 30° in the Y direction corresponding to the major axis of the ellipse, and over a total angular sector of 5° in the X direction corresponding to the minor axis of the ellipse. The transmitter is arranged in such a manner that the major axis is parallel to the direction in which it is expected that the transmitter will be displaced relative to the receiver. This improves the ability to guarantee that the signal will be transmitted in spite of any relative displacement of the transmitter and the receiver, and for this to be achieved without pointlessly delivering too much energy to the beam in the other transverse direction, corresponding to the minor axis of the ellipse, where the width of the beam remains modest. The elliptical shape is thus well adapted to the extremes of static or dynamic structural deformation that are to be expected while the airplane is in flight.

It is advantageous for the beam to extend in both transverse directions over at least 3° or 5°, regardless of whether it is elliptical or circular in shape. This ensures that the flow of air over the surface of the airplane in flight has little influence on the propagation of the signal. Flow has the sole effect of deflecting the beam in three dimensions through an angle of a few minutes, which angle remains well below the width of the beam in the or each transverse direction occupying a few degrees, e.g. in the direction of the minor axis of the ellipse when the section is elliptical.

The transmitters, the receivers, and the relays are arranged on the various portions of the airplane at locations that facilitate direct transmission of signals between one another through the outside environment, while avoiding interfering reflections of signals on the structure of the airplane. The members are preferably mounted in such a manner as to avoid accumulating water or dirt on the window through which the member operates. For this purpose, a member 48 may be provided for deicing the window, possibly a member that is dedicated to said window.

Figure 16:
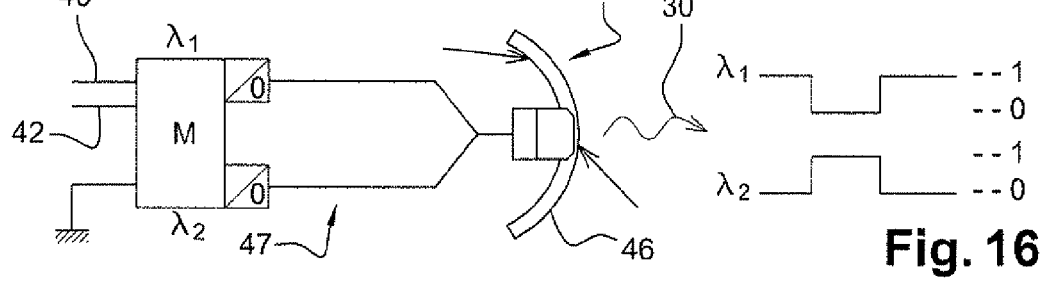

In the variant of the member shown in FIG. 16, the member is arranged to transmit the signal 30 simultaneously on two mutually different wavelengths $\lambda 1$ and $\lambda 2$. On each wavelength, the signal is transmitted in the form of a succession of "0s" and of "1s", which on being decoded provide the data conveyed by the signal. Furthermore, the signals at the two wavelengths are complementary to each other, such that when one wavelength is transmitting a "1", the other is transmitting a "0", and vice versa. This thus provides redundancy in transmission. The module thus has two transmitters emitting respective signals and powered by an optical coupler 47. This implementation of the method serves to reduce risks associated with possible interruptions of the signal, e.g. in the presence of hail or birds.

Figure 17:
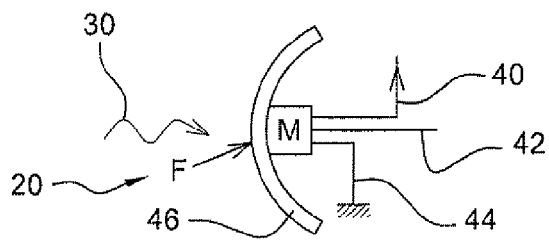

FIG. 17 shows a member 20 forming a receiver or a relay. In addition to deicing means, the window of the receiver is fitted with a bandpass type interference filter presenting a spectrum width that matches the spectrum width of the transmitted signal or that is close thereto, for the purpose of limiting the influence of solar radiation on the receiver, which might otherwise give rise to a glare phenomenon. If the receiver is designed to receive the corresponding signal at a wavelength $\lambda_i$, the filter is centered on this wavelength and presents a passband of width of the type $\lambda_i + a\lambda_i$, where a is a real number. Provision may also be made to fit the receiver with special optics seeking to limit its acceptance angle, or indeed with one or more lenses for limiting any interfering effects that might remain, such as reflections. The module M has one or more circuits for shaping the received optical signal, e.g. by transimpedance. The receiver is also connected to the internal communications network of the airplane by a cable 40, it is electrically powered by a cable 42, and it is grounded by a cable 44.

Figure 18:
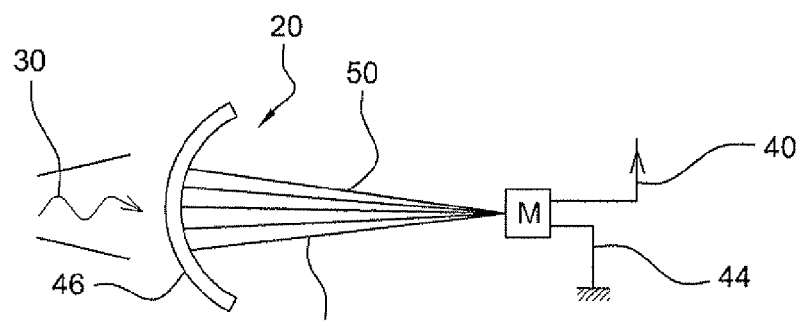

With reference to FIG. 18, the receiver 20 may have a plurality of optical fibers 50 in a light-concentrating bunch. Each fiber extends in a rectilinear direction and the fibers are spread over a solid angle having its apex occupied by the module at the ends of the fibers from which the received signal exits. At their other ends, the fibers are spread against the inside face of the inlet window for the signal 30. The fibers within the module M are connected to one or more detectors suitable for converting the light signal that is obtained into an electrical signal that is subsequently forwarded to the on-board communications network.

Figure 19:
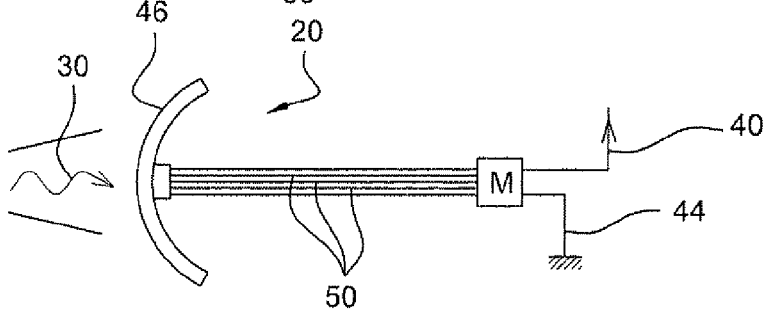

Reference may also be made to FIG. 19, which shows that the fibers need not be arranged as a light-concentrating bunch, but may be arranged as a compact bundle of parallel fibers that are close together, including at the window.

It can be seen that the invention makes it possible to cause communications between two devices of an airplane to transit at least once solely via the environment outside the airplane.

For safety reasons concerning airport ground personnel, provision may be made for the communications method of the invention to be implemented differently when the airplane is on the ground and when the airplane is in flight.

Naturally, numerous modifications may be applied to the invention without going beyond the ambit thereof.

The invention claimed is:

1. A method of communication on a vehicle constituting an aircraft or a spacecraft, wherein the vehicle transmits an electromagnetic signal from at least one transmitter on-board the vehicle directly to at least one receiver on-board the vehicle and solely through an environment outside the vehicle, and wherein transmission of the same signal takes place several times over, and during the transmissions of the same signal, at least one member from the group comprising at least the transmitter and at least the receiver is set into movement relative to other members of the group.

2. A method according to claim 1, wherein there is only one transmitter and there are at least two receivers.

3. A method according to claim 1, wherein there are at least two transmitters and only one receiver.

4. A method according to claim 1, wherein there are the same number of transmitters and receivers, said number being at least two, transmission taking place simultaneously from a first of the transmitters exclusively to a first of the receivers and from a second of the transmitters exclusively to a second of the receivers.

5. A method according to claim 1, wherein the or each receiver is a first transmission receiver and forms a relay, with the vehicle subsequently transmitting the signal from the or each relay directly to at least one second transmission receiver, transmission taking place solely through the outside environment.

6. A method according to claim 5, wherein there is only one transmitter, there being at least two relays, and only one second transmission receiver.

7. A method according to claim 1, wherein the transmission takes place by laser.

8. A method according to claim 1, wherein the transmission takes place by radiowave.

9. A method according to claim 1, wherein transmission takes place simultaneously on at least two different wavelengths.

10. A method according to claim 1, wherein the vehicle forwards the signal to an internal on-board communications network of the vehicle.

11. A communications method on a vehicle forming an aircraft or a spacecraft, wherein at least one member on board the vehicle transmits an electromagnetic signal in an environment outside the vehicle directly to at least one other member on board the vehicle, and wherein transmission of the same signal takes place several times over and during the transmissions of the same signal, the transmitter is set into movement relative to at least one other transmitter or at least one receiver on the vehicle.

12. A communications method on a vehicle forming an aircraft or a spacecraft, wherein at least one member on board the vehicle receives an electromagnetic signal in an environment outside the vehicle directly from at least one other member on board the vehicle, and wherein reception of the same signal takes place several times over and during the receptions of the same signal, the receiver is set into movement relative to at least one other receiver or at least one transmitter on the vehicle.

13. A vehicle constituting an aircraft or a spacecraft, wherein the vehicle includes at least one on-board transmitter and at least one on-board receiver arranged in such a manner that the vehicle transmits, several times over, a same electromagnetic signal from the transmitter directly to the receiver and solely through an environment outside the vehicle, and during the transmissions of the same signal at least one member from the group comprising the transmitter and the receiver is set into movement relative to the other members of the group.

14. A vehicle according to claim 13, wherein the or one of the transmitters or receivers is carried directly by one of the following elements of the vehicle: a fuselage, a tail, a wing, an engine, and a mast.

15. A method according to claim 1, wherein the movement includes rotation.

* * * * *